(12) United States Patent
Verboom

(10) Patent No.: US 6,233,209 B1
(45) Date of Patent: May 15, 2001

(54) TRACKING METHOD AND TRACK FORMAT BASED ON RADIAL CROSS-TALK FROM ADJACENT TRACKS

(75) Inventor: Johannes Jacobus Verboom, Colorado Springs, CO (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/127,001

(22) Filed: Jul. 31, 1998

(51) Int. Cl.[7] .................................................. G11B 7/00
(52) U.S. Cl. ...................................... 369/44.34; 369/275.3
(58) Field of Search ............................... 369/44.25, 44.27, 369/44.28, 44.34, 47, 48, 275.3, 275.4, 44.26, 47.35, 47.15, 47.16, 47.17, 47.18, 124.05, 44.32

(56) References Cited

U.S. PATENT DOCUMENTS

| 4,960,680 | 10/1990 | Pan et al. | |
|---|---|---|---|
| 5,270,991 | 12/1993 | Verboom | 369/44.26 |
| 5,434,836 | 7/1995 | Kuribayashi et al. | 369/44.34 |
| 5,646,932 | 7/1997 | Kuribayashi et al. | 369/275.3 |

FOREIGN PATENT DOCUMENTS

| 4220192A1 | 4/1993 | (DE) . |
| 0721182A1 | 7/1996 | (EP) . |

*Primary Examiner*—Paul W. Huber
(74) *Attorney, Agent, or Firm*—Steven R. Biren

(57) ABSTRACT

An optical recording medium having a number of adjacent tracks for storing digital optical information extending in a first direction. The tracks are separated by a pitch amount in a second direction and each track has a servo field comprising at least one synchronization mark and at least one tracking mark in one of at least three positions on the track. The tracking marks of tracks adjacent in the second direction to a first track are in different positions from each other and from the position of the tracking mark on the first track. The track marks extend in the second direction to give rise to cross-talk from the tracking marks of adjacent tracks when the first track is being read.

16 Claims, 7 Drawing Sheets

TRACKING METHOD AND TRACK FORMAT BASED ON RADIAL CROSS-TALK FROM ADJACENT TRACKS

BACKGROUND AND SUMMARY OF THE INVENTION

This invention generally pertains to the field of digital data recording. In particular, the invention focuses on a tracking method and track format for optical data recording.

An optical record carrier, also referred to as an optical disc, is typically divided into a large number of concentric tracks. Tracks are where digital information is stored in the form of marks and pits, and from which information will be read or retrieved. A track of a spinning disc is read via the light reflected from the marks and pits, which is processed into an electrical signal.

(While pits and marks can refer to, respectively, the pre-formatted data and the information that is stored by the user on the disc, such distinctions in nomenclature is not always made. Thus, this Application will generally refer to "marks" as any information (pre-formatted information, information written by the user, etc.) on the disc.)

For a disc having multiple concentric tracks, the direction at a point along a track is referred to as the tangential direction, while the direction normally across the tracks (i.e., from the center of the disc outward) is referred to as the radial direction.

The pre-formatted data on the tracks of the disc include a servo field or region. Marks in the servo field are used to maintain the laser's radial alignment with respect to the particular track that is being read. The reading and processing of marks in the servo field provide an indicia of the laser's radial position with respect to a track and allow for it's correction. Thus, proper reading and processing of the other marks (such as the information stored by the user) on the track is better assured.

An example of a prior art track format of the servo field is described in U.S. Pat. No. 5,270,991. FIG. 1 gives a simplified schematic of the format described in the '991 patent of certain marks in the servo field. It is noted that although the four tracks shown in FIG. 1 (labeled Tracks 1–4) are concentric with the center of the optical disc they reside on, the part of the servo field shown in FIG. 1 is a small portion of the overall track and thus appears as a straight line in FIG. 1. The same applies for ensuing figures.)

As seen, the tracking marks are located at tangential positions A and B for each track. The tracking marks are radially located between tracks and on alternate sides of a particular track. For tracks designated with an odd number in FIG. 1, tracking mark A is above the track, while tracking mark B is below the track. For even numbered tracks, the radial positions with respect to the track are reversed.

Also shown in FIG. 1 is the resulting electrical signal for laser light projected on tracks 2 and 3. As seen, because each track runs between tracking marks A and B, for proper tracking by the laser, the magnitudes of the signals generated by marks A and B should be equal. If they are not, an adjustment of the radial position of the laser light is made, based on the relative magnitude of the signals corresponding to marks A and B. (For example, if the signal from mark A is greater than that generated by mark B for track 2, that indicates that the laser must be adjusted radially upwards (i.e., in the direction of track 1) in order to lie directly on track 2.) The difference in signal strength indicates by how much.

Also shown in FIG. 1 are two synchronization marks (labeled "BOS mark" for Beginning Of Segment mark and "CLK mark" for Clock mark). These synchronization marks, which lie directly on the track, indicate (via timing) where the track marks are and thus provide "capture" of the track marks (and subsequent marks on the track).

A difficulty associated with the prior art format of FIG. 1 is the creation of marks that are not on the track, but are instead between adjacent tracks. Generally devices that pre-format and/or write marks on optical discs are designed to write onto the track itself. Writing in between adjacent tracks creates additional complexity, requiring deflectors and/or second laser beams, and thus adds to the cost while reducing reliability.

Another difficulty with the format of FIG. 1 is that the optical beam may wander between tracks. Having the synchronization marks lying directly on the track can result in a loss of detection of the mark, which can lead to a loss of synchronization. A loss of synchronization upon entering the servo field will result in loss of the system and requires a lengthy recovery procedure.

FIG. 2 shows a prior art variation of the format of FIG. 1. As shown, there are synchronization marks that lie both on the tracks and between adjacent tracks. An optical beam that wanders between tracks will still be detected and the signal may be processed to correct the position of the beam entering the servo field. While this addresses the second difficulty noted above with respect to the prior art format shown in FIG. 1, it requires additional off-track marks and thus compounds the first problem noted above.

It is thus an objective of the invention to create a method of formatting and a format for the servo field of an optical disc that eliminates the need for off-track marks. It is also an objective to provide a system for reading and processing the format. It is also an objective of the invention to create a method of formatting and a format for the synchronization marks of an optical disc that lie entirely on-track, but can be used in detecting and correcting the position of an optical beam that has deviated to a position between tracks.

The invention provides a method of formatting and a format for the servo field of an optical disc using on-track marks. The format uses a mark that is oblong, i.e., wider in the direction perpendicular to the track. For example, in one embodiment the marks have an elliptical shape centered on the track, with the long axis perpendicular to the track (for an optical disc, in the radial direction).

The oblong shape of the marks in the server field, as well as their alignment, extend the mark into the region between tracks. Thus, an optical beam tracking a particular track will detect the servo field marks of adjacent tracks. (This detection of marks in the servo field of adjacent tracks is referred to as "cross-talk".)

The signals created by the cross-talk of tracking marks from adjacent tracks surrounding the track under consideration can be processed in a system according to the present invention to give an indicia of the tracking error of the optical beam. For example, if the magnitude of the cross-talk of marks from adjacent tracks is equal, then the optical beam is properly radially aligned on the track under consideration. If the signal created by the cross-talk of one adjacent track is larger than that created by the cross-talk of the opposite track, then the beam is off-track and must undergo a radial adjustment. Processing of the relative magnitudes of the cross-talk of adjacent tracks gives an indicia of by how much the beam must be adjusted.

For the synchronization marks, if the beam has strayed into the region between tracks, then the signal created by the oblong shape of the track under consideration and/or the cross-talk that arises from the oblong shape of the adjacent track will be detected and will thus result in proper synchronization.

The invention thus includes an optical recording medium having a number of adjacent tracks for storing digital optical information extending in a first direction. The tracks are separated by a pitch amount in a second direction and each track has a servo field comprising at least one synchronization mark and at least one tracking mark in one of at least three positions on the track. The tracking marks of tracks adjacent in the second direction to a first track are in different positions from each other and from the position of the tracking mark on the first track. The track marks extend in the second direction to give rise to cross-talk from the tracking marks of adjacent tracks when the first track is being read.

The invention also includes a method of formatting an optical medium having a number of adjacent tracks for storing digital optical information extending in a first direction, where the tracks are also separated by a pitch amount in a second direction. The method comprises the steps of:
 a) creating a first tracking mark on a first position of a first track,
 b) creating a second tracking mark on second position of a second track adjacent to the first track,
 c) creating a third tracking mark on a third position of a third track adjacent to the first track, and
 d) configuring the tracking marks to extend in the second direction such that optical reading of the first track will detect cross-talk signals of the second and third tracking marks on the adjacent tracks.

The invention also includes a system for adjusting the tracking of a track of an optical recording medium. The track has a tracking mark located at one of at least three positions on the track. The first of two adjacent tracks has a tracking mark at one of the other positions and the second of two adjacent tracks has a tracking mark located at the second of the other positions. The system comprises:
 a) an optical signal processor for generating a signal from the track being read,
 b) a first sampler which stores a sample portion of the signal corresponding to a tracking mark at the first of the three positions,
 c) a second sampler which stores a sample portion of the signal corresponding to a tracking mark at the second of the three positions,
 d) a third sampler which stores a sample portion of the signal corresponding to a tracking mark at the third of the three positions,
 e) a operator which operates on the first, second and third samples to determine the two samples that arise from cross-talk of tracking marks from the adjacent tracks, and
 f) a transferor which transfers a correction signal reflecting the difference in amplitudes of the two samples identified as arising from cross-talk.

The invention also includes a system for adjusting the tracking of an optical recording medium comprising:
 a) means for generating a signal by reading a track of an optical recorder,
 b) means for sampling the signal at at least three positions corresponding to tracking mark positions in a servo field along the track,
 c) means for identifying one sample corresponding to one of the tracking mark positions as being generated by an on-axis tracking mark and identifying the other two samples corresponding to the other two tracking mark positions as being generated by cross-talk signals of adjacent tracks, and
 d) means for adjusting the tracking based upon the difference in the samples of the cross-talk signals.

The invention also includes a method for adjusting the tracking of an optical recording medium comprising the steps of:
 a) generating a signal by reading a track of an optical recorder,
 b) sampling the signal at at least three positions corresponding to tracking mark positions in a servo field along the track,
 c) identifying one sample corresponding to one of the tracking mark positions as being generated by an on-axis tracking mark and identifying the other two samples corresponding to the other two tracking mark positions as being generated by cross-talk signals of adjacent tracks, and
 d) adjusting the tracking based upon the difference in the samples of the cross-talk signals.

Particular embodiments will be discussed further below, as well as a system for processing the cross-talk received in order to correct the tracking.

BRIEF DESCRIPTION OF THE DRAWINGS

For better understanding of the invention, reference is made to the following drawings which are to be taken in conjunction with the detailed description to follow.

DETAILED DESCRIPTION

Figure 1:
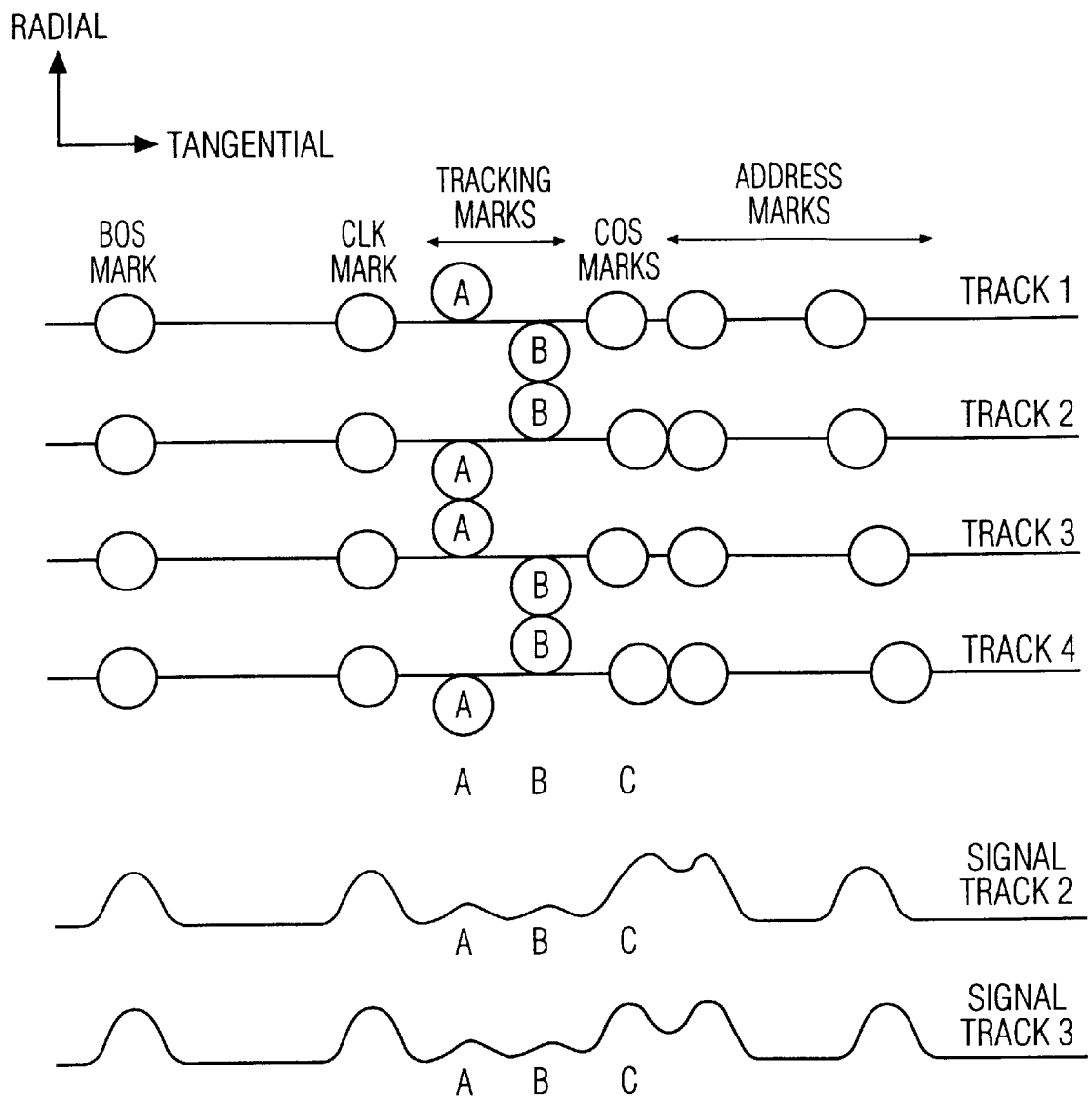
FIG. 1 is a schematic of a prior art format of a servo field of an optical disc and the resulting electrical signal from optical scanning of two of the tracks of that disc.
Figure 2:
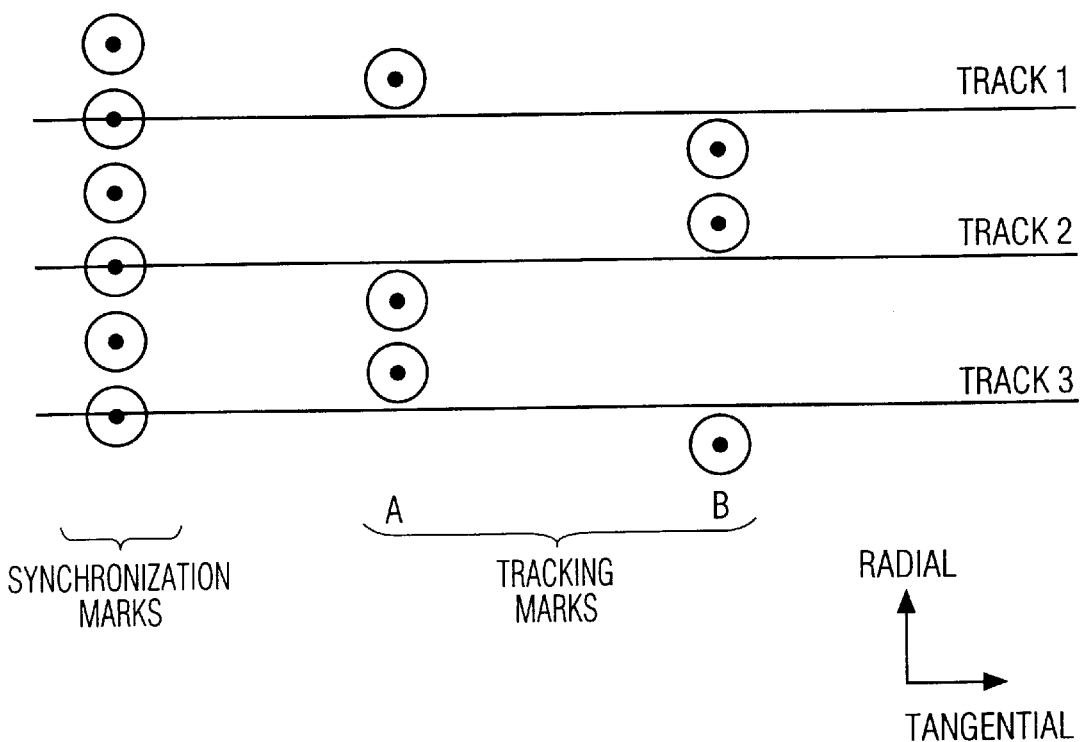
FIG. 2 is a schematic of another prior art format of a servo field of an optical disc.
Figure 3:
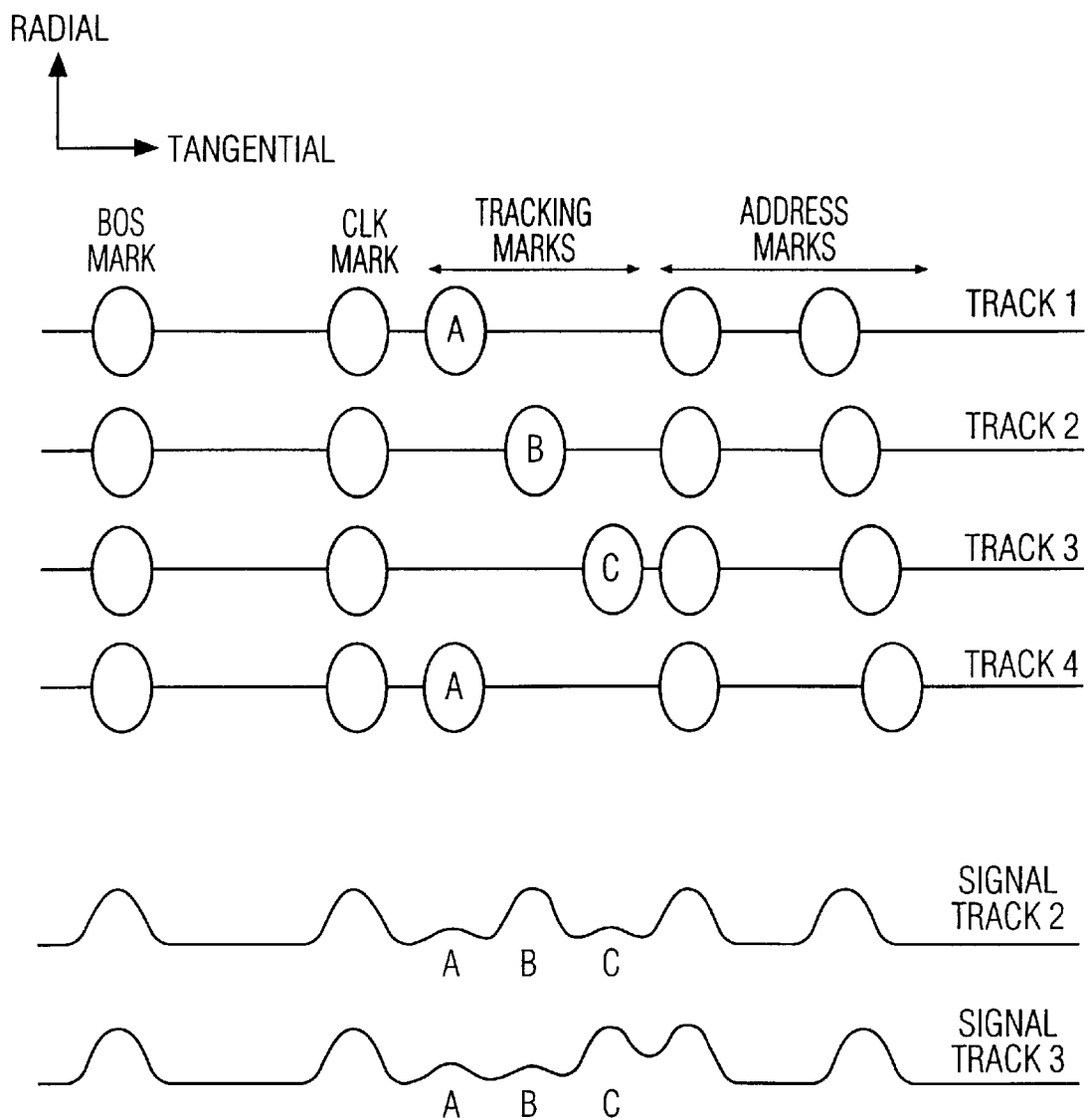
FIG. 3 is a schematic of a format of a servo field of an optical disc for the present invention and the resulting electrical signal from optical scanning of two of the tracks of that disc.

Referring to FIG. 3, an embodiment of a format for a servo field of an optical disc in accordance with the present invention is shown. As seen, the marks are in the shape of an oval or ellipse, with the long axis of the ellipses aligned perpendicular to the tracks (in the radial direction). All marks are also centered on the tracks; no marks lie between tracks, as in FIGS. 1 and 2.

Focusing on the tracking marks of the servo field in FIG. 3, there is one tracking mark for each track. The tracking mark on a track is located in one of three positions on the track, designated A, B, or C.

Also shown in FIG. 3 is the electrical signal resulting from the processing of the optical beam from the tracks designated 2 and 3. For Track 2, the tracking pit is located at the B position and, as seen in the signal for Track 2, there is a relatively large maxima corresponding to position B. However, it is also seen that there are smaller maxima at corresponding to positions A and C. These arise from the cross-talk from the tracking marks on adjacent Tracks 1 and 3, respectively.

Similarly, the signal for Track 3 exhibits a relatively large maxima corresponding to position C (where the tracking pit for Track 3 is located), as well as smaller maxima corresponding to positions A and B, which arise from the cross-talk of the tracking marks for Tracks 4 and 2, respectively.

It is readily seen that if the cross-talk signals from the tracking marks of adjacent tracks are equal in magnitude, then the optical beam is correctly positioned radially for proper tracking. For example, referring to the signal corresponding to Track 2, if the magnitude of cross-talk signal A (from the tracking mark on Track 1) is equivalent to cross-talk signal C (from the tracking mark on Track 3), then the beam is centered on Track 2. (This is evident, because the beam is then equidistant from the tracking marks on the adjacent tracks.)

On the other hand, when the cross-talk signals of adjacent tracks are not equal in magnitude, then the beam is not radially positioned on the track. For Track 2, if cross-talk signal A is greater than cross-talk signal C, then the optical beam is radially positioned closer to the A mark on Track 1; i.e., it is not radially centered on Track 2, but instead is shaded toward Track 1.

The difference in signal strength of the cross-talk signals reflects the error in the radial positioning of the beam with respect to the track. This difference, referred to as the "radial error signal" can be sent to the servo-loop to control an appropriate adjustment of the position of the beam. (Conceptually, this adjustment would make the cross-talk signals equivalent.)

It is evident from FIG. 3 that where the tracking mark for a particular track is at position A, then cross-talk signals for positions B and C will be compared. For a tracking mark located at position B for a track, cross-talk signals for positions A and C are compared. Finally, for a tracking mark located at position C for a track, cross-talk signals for positions A and B are compared.

Figure 4:
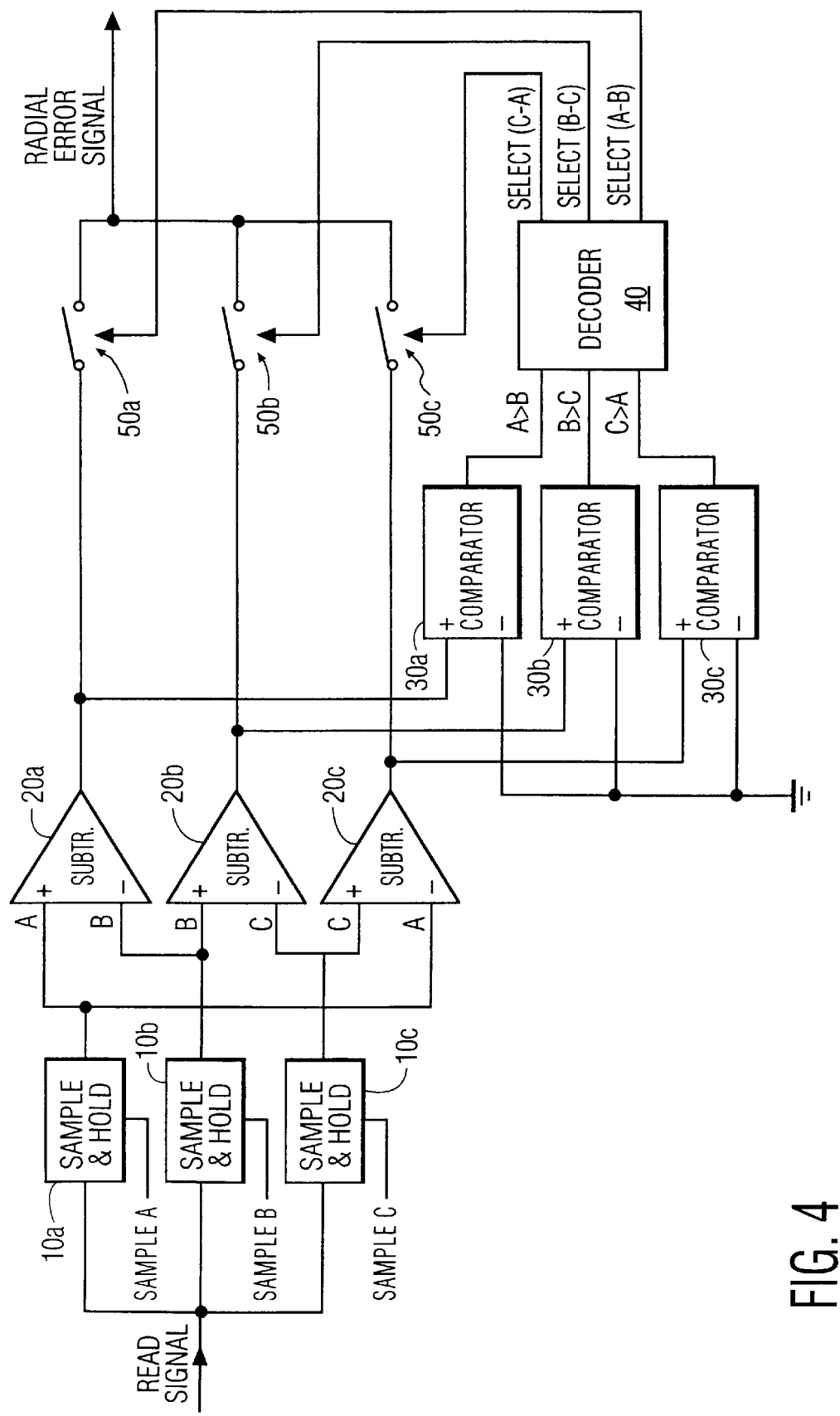
FIG. 4 is a block diagram of a system for processing the signal read from a track of the optical disc as formatted in FIG. 3.

FIG. 4 gives a particular embodiment of the processing of the signal read from a track in order to obtain the appropriate radial error signal that is sent to the servo-loop to adjust the tracking. The electrical signal that is generated by the optical signal reading a track (designated the "read signal" in FIG. 4) is sampled at points A, B and C. The sampled signals are stored in a separate sample and hold devices 10a, 10b, 10c.

The samples of signals A, B and C become inputs for three subtractors 20a, 20b, 20c. Each sample provides an input for two of subtractors. As shown, the inputs for subtractor 20a are sampled signals A and B and its output is A–B, the inputs for subtractor 20b are sampled signals B and C and its output is B–C and the inputs for subtractor 20c are sampled signals C and A and the output is C–A. The output of each subtractor 20a, 20b, 20c is sent to a comparator 30a, 30b, 30c, respectively.

The comparators determine whether the output of the corresponding subtractor is greater than zero. Thus, comparator 30a determines if A is greater than B, comparator 30b determines if B is greater than C and comparator 30c determines if C is greater than A. The outputs of the comparators 30a, 30b, 30c provide the inputs to decoder 40.

The decoder 40 determines which two signals in the read signal arise from cross-talk of the tracking marks on adjacent tracks. For each signal A, B, and C, the decoder table shown in FIG. 4 determines 1) whether the signal is greater than one of the other two signals and 2) whether the other of the two signals is not greater than the signal.

The signal that meets both of these conditions will be the on-track tracking mark. (For example, if the on-track signal is at C, then the signal from C will be greater than A and the signal from B will not be greater than the signal from C. Thus, signal C has the largest amplitude.) Correlatively, the other two signals (A and B in the example) will be the ones that arise from cross-talk from marks on adjacent tracks, and the output selected from the decoder reflects that.

The selected output closes one of three switches 50a, 50b or 50c based on which two signals are identified by the decoder 40 as the signals arising from cross-talk. If the decoder 40 identifies signals A and B as arising from cross-talk, then the "Select(A–B)" output of decoder 40 closes switch 50a, which passes the difference in the signals A–B on to the servo loop as the radial error signal. Similarly, if the decoder 40 identifies signals B and C as arising from cross-talk, then the "Select(B–C)" output of decoder 40 closes switch 50b, which passes the difference in the signals B–C on to the servo loop as the radial error signal. Finally, if the decoder 40 identifies signals C and A as arising from cross-talk, then the "Select(C–A)" output of decoder 40 closes switch 50c, which passes the difference in the signals C–A on to the servo loop as the radial error signal.

Figure 5:
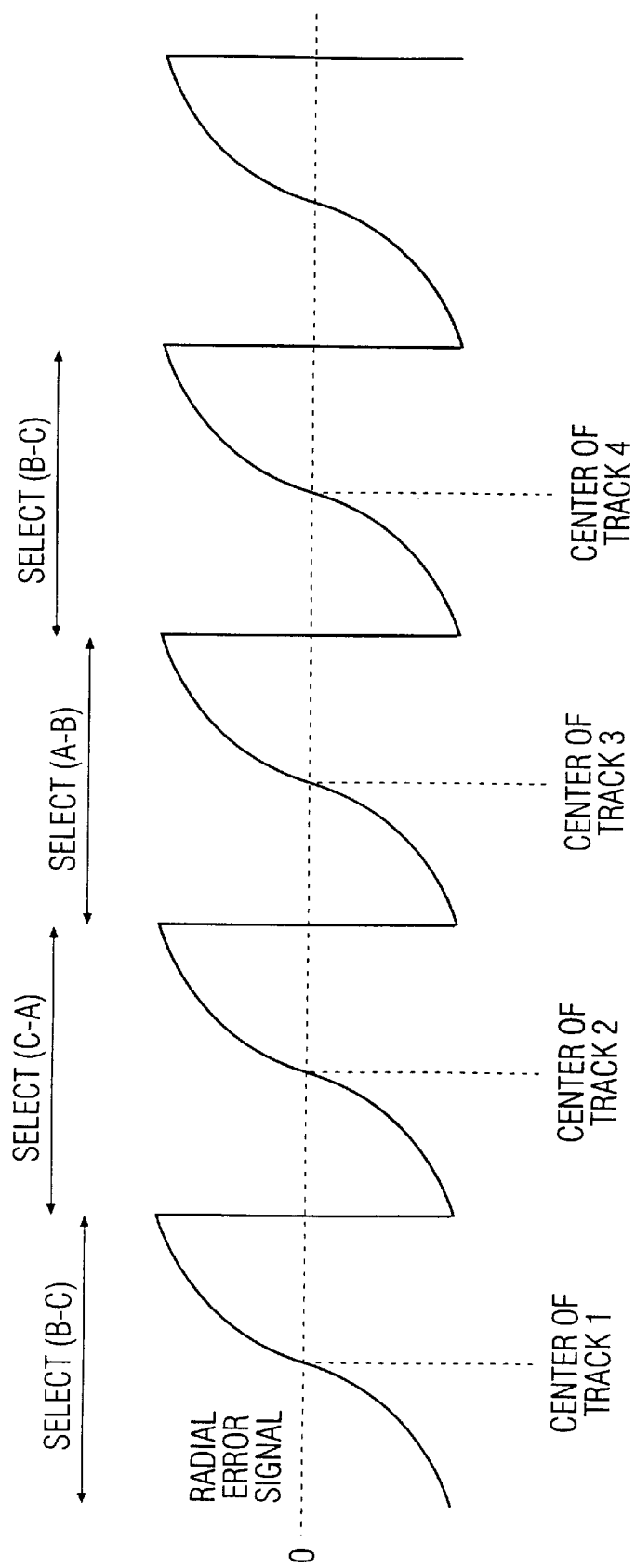
FIG. 5 is the radial error signal output of the system of FIG. 4 for the tracks on the optical recorder shown in FIG. 3.

FIG. 5 shows the radial error signal that is passed on to the servo loop from the processing (FIG. 4) as a function of radial position for Tracks 1–4 (FIG. 3). As noted above, the servo loop corrects the tracking of the optical beam based on the difference between the signals arising from cross-talk of adjacent tracks. Whether the radial error signal is positive or negative also indicates in which direction the tracking must be corrected.

Referring back to FIG. 3, it is also seen that the synchronization marks (i.e., the BOS and CLK marks) are all located on-track and are also in an elongated shape, in this case an ellipsoid like the tracking marks. By having the synchronization marks so shaped and positioned, a sufficiently strong signal will be detected by the optical beam even if the beam strays radially between tracks. Thus, synchronization will be maintained without the need for additional marks between tracks.

The ellipses should have a sufficiently high aspect ratio to provide adequate cross-talk. The necessary amount of cross-talk is related to the signal-to-noise ("SNR") of the optical disc or system.

Typically, a data mark on a track of optical recording media has an SNR on the order of 50 dB (for a measured bandwidth ("BW") on the order of 30 kHz). Further, the permitted cross-talk from from a data mark on an adjacent track is on the order of –32 dB relative to the signal of a mark that lies on the track.

The SNR of the cross-talk is the ratio of the cross-talk signal strength to the background (media) noise on the track. It follows from the above that the SNR of the cross-talk is on the order of 18 dB.

Presuming that the ABC tracking marks have a comparable size to the data marks, an SNR of 18 dB is considered inadequate for reliable tracking, where the tracking servo and system must follow the track with an accuracy of about 5% of the trackpitch. Reduction of the trackpitch is one conceivable design option to raise the SNR of cross-talk from the tracking marks for the tracking servo, but would also raise cross-talk from data marks to an unacceptable level.

An SNR for the cross-talk of tracking marks on the order of 30 dB or greater (for a measured BW on the order of 30 kHz) is preferable for reliable tracking by the tracking servo. Thus, using the parameters given above, the cross-talk from the ABC tracking marks must be −20 dB with respect to the signal of an on-track mark, or, equivalently, the cross-talk must be 10% (or more) of the on-track mark.

As an example of how these concepts translate into the configuring of a particular ellipse size for a tracking mark, the Philips LMS LD8000 system will use circular data marks having a diameter of approximately 660 nm and a track pitch of approximately 850 nm. Starting with a tracking mark of the same size, the width of the mark in the radial direction must be expanded to approximately 1050 nm or more in order to achieve a 10% cross-talk. Using these two dimensions, 660 nm tangential width and 1050 nm radial width, translates into an ellipse having an aspect ratio of approximately 1.59. Of course, since the 1050 nm is a minimum width, the aspect ratio can be greater than 1.59. For example, a prudent design would have tracking marks with an aspect ratio of 1.8.

The marks in the servo field do not necessarily have to be ellipsoidal. Any shape is acceptable provided it extends sufficiently into the region between tracks to provide for sufficient cross-talk. Thus, the signals could conceivably be rectangular, or even over-sized circles. (However, if the tracking marks were circular that would raise the overhead, because the marks would have to separated more in the tangential direction, in order to provide adequate tangential resolution.) As noted above, the radial expanse of the mark typically should be sufficient to provide an SNR of approximately 30 dB or greater for the cross-talk signal. For typical SNR of an optical media, a sufficient amplitude for the cross-talk signal is 10% (or more) of the on-track mark amplitude.

While other shapes for the marks would provide sufficient cross-talk, the ellipsoidal shape having the long axis oriented in the radial direction is currently the preferred embodiment. The short axis oriented in the tangential direction (i.e., along the track) is desirable for good tangential resolution (i.e., greater separation between signals generated by the on-track marks) and for a low format overhead (i.e., the amount of tangential space needed to accommodate the servo field).

Moreover, creation of marks having an ellipsoidal or near-ellipsoidal shape is straight-forward. Index guided semiconductor lasers, for example, are notorious for radiating an elliptical beam. Optical recording devices usually employ optics to reduce the ellipticity of the spot at the recording medium (although many such optics cannot completely eliminate the ellipsoidal shape, thus creating marks that are slightly ellipsoidal.) By eliminating such optics, or by adding features that will enhance the ellipticity of the beam, a sufficiently high aspect ratio can be easily achieved and can thus be used for servo-writers.

For mastering equipment for pre-formatting masters/ stampers, gas-lasers are usually relied on because of the higher power requirement. The beams from these lasers are fairly circular, so optical components would have to be added to create an elliptical spot. As an alternative to rendering a circular spot elliptical, the beam may be split into two slightly separated, overlapping beams, which approximate an ellipse. (Such splitting of the beam could be done using fixed optics and thus does not give rise to the complexities and reliability problems associated with deflecting or switched splitting of the beam needed to write in between tracks as in the prior art formats.)

Figure 6:
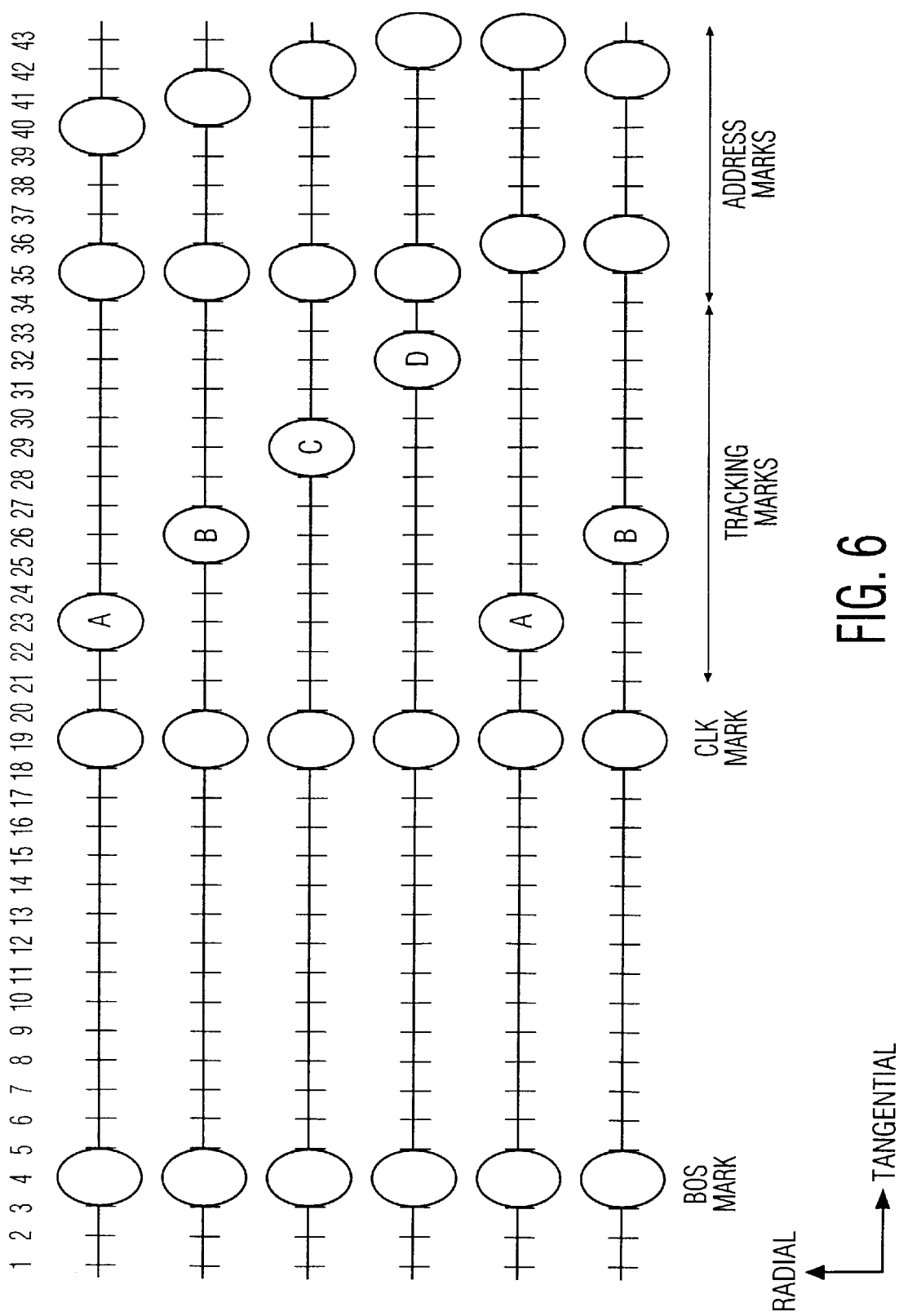
FIG. 6 is a schematic of an alternative format of a servo field of an optical disc for the present invention.
Figure 7:
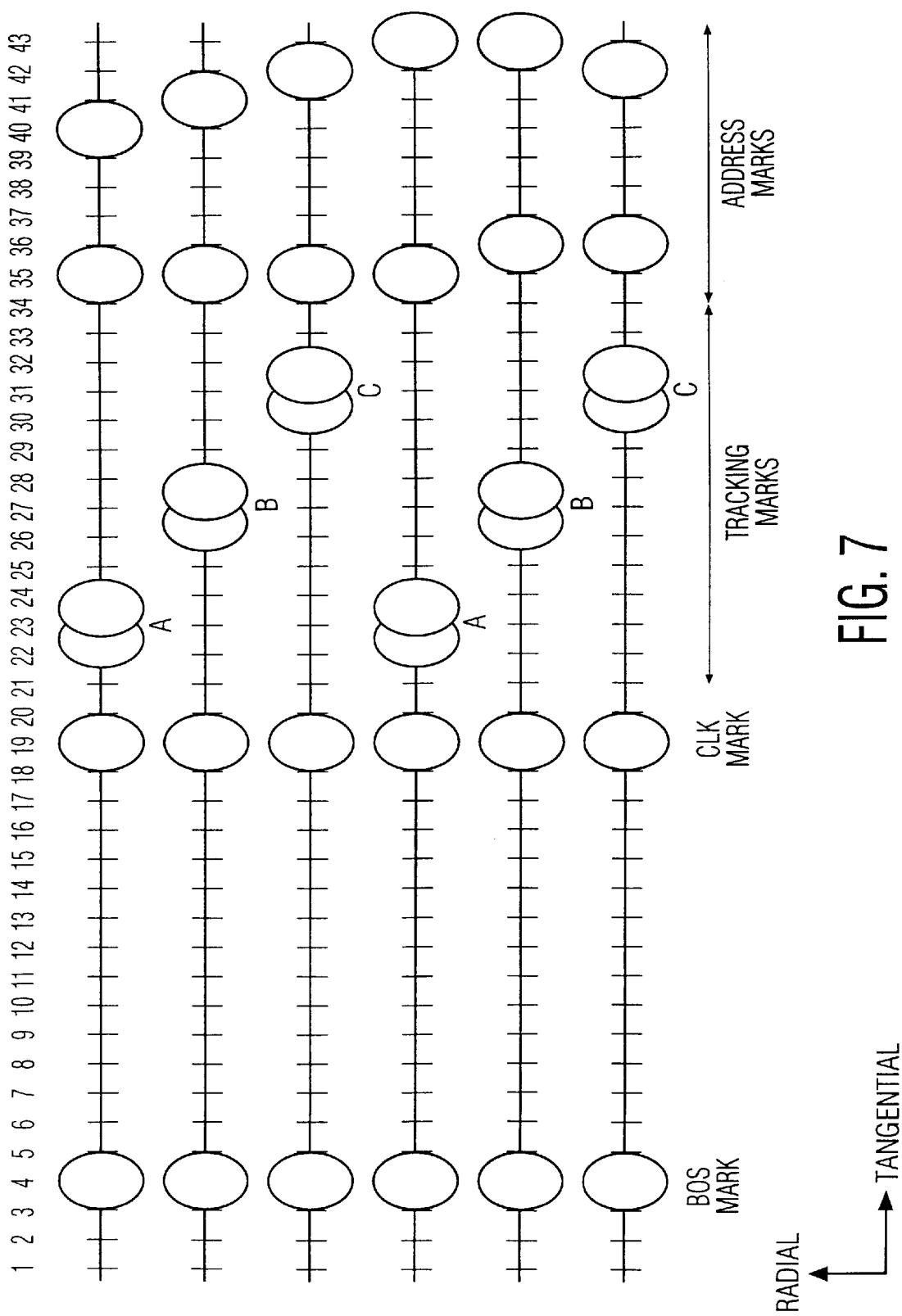
FIG. 7 is a schematic of an alternative format of a servo field of an optical disc for the present invention.

FIGS. 6 and 7 give alternative embodiments of the present invention. In FIG. 6, there is a fourth position D for an on-track tracking mark. One advantage of this configuration is that each of the positions of the four tracking marks can be synchronized with one of the four numbers in the two least significant bits of the track address, thus providing a simple defect protection scheme. The additional tracking mark has a few disadvantages, however, such as requiring additional space (overhead) for the tracking marks and additional processing to arrive at the radial error signal.

The embodiment of FIG. 7 addresses another problem: Sharp peaks of the tracking mark signals combined with some phase error of adjacent marks may result in amplitude variations due to track-track phase jitter. If the peaks are sharp, then a slight deviation in the timing of the sampling can lead to a sample of the track mark that is smaller than its peak. This could possibly result in confusion between the on-track signal and the cross-talk from off-track signals.

FIG. 7 shows another alternative embodiment that is similar to that shown in FIG. 3 and described in detail above. In FIG. 7, however, each on-track tracking mark is comprised of two overlapping ellipsoids that are offset in the tangential direction. By spreading the signal, the timing of the sampling can have some error and still sample a large peak for the on-track signal. A longer tracking mark in the tangential direction, such as that shown in FIG. 7, will make the peaks flatter, thus creating more phase margin. The peak can alternatively be flattened by adjusting the optics to make the aspect ratio such that the axis is longer in the tangential direction. (In the extreme case, the axes are equal, giving an oversized round mark.) However, the cost of addressing this problem is use of more overhead by the tracking marks.

While the discussion above has focused on the inventive format and apparatus as applied to optical discs, it can also be applied to any optical media having tracks. For example, the invention can be applied to optical tapes having a series of straight tracks running the length of the tape. (Indeed, FIG. 3 and the description above relating thereto would also apply directly to an optical tape having multiple tracks extending along the length of the tape.)

For an optical tape, of course, the tracks extend straight down the tape. That is, they are not circular about the center of the disc. However, there is still a servo loop for maintaining proper tracking by correcting the position of the optical beam in the direction normal to the track (designated the "radial" direction for optical discs). Thus, by using the format of the present invention for optical tapes, the same benefits are attained, such as good tracking and reliable synchronization, while eliminating off-track marks.

Moreover, the invention is not necessarily limited to optical media. It can be applied to any media that having multiple tangential tracks along with a servo field. Thus, the format can be applied to various magnetic media, including floppy discs and magnetic tapes. For magnetic media, which use transitions of magnetic fields to store digital information, the tracking signals (such as A, B and C) located on-track would be transitions.

The above described embodiments are merely illustrations of the present invention. Numerous modifications and adaptations thereof will be readily apparent to those skilled in the art without departing from the spirit and scope of the present invention and the appended claims. Thus, the above description should be considered a representative embodiment of the invention and not a limitation on the scope of the invention.

What is claimed is:

1. An optical recording medium having a number of adjacent tracks for storing digital optical information extending in a first direction, the tracks separated by a pitch amount in a second direction, the tracks each having a servo field comprising at least one synchronization mark and at least one tracking mark in one of at least three positions on the track the tracking marks of tracks adjacent in the second direction to a first track being in different positions from each other and from the position of the tracking mark on the first track, the track marks extending in the second direction to give rise to cross-talk from the tracking marks of adjacent tracks when the first track is being read, and wherein the tracking marks extend further in the second direction than in the first direction.

2. An optical recording medium as in claim 1, wherein the tracking marks are ellipsoidally shaped.

3. An optical recording medium as in claim 1, wherein tracking marks on adjacent tracks are positioned such that the cross-talk created by adjacent tracks is equal in magnitude when the first track is being read.

4. An optical recording medium as in claim 1, wherein there is one tracking signal for each track in one of three positions in the first direction along the track.

5. An optical recording medium as in claim 4, wherein the position of the tracking marks of tracks adjacent in the second direction alternate sequentially between a first, second and third position in the first direction.

6. An optical recording medium as in claim 1, wherein the optical recording medium is an optical disc, the tracks extending concentrically about the center of the disc, the first direction being along the tracks and the second direction being radial from the center of the disc across the tracks.

7. An optical recording medium as in claim 1, wherein the optical recording medium is an optical tape, the tracks extending along the length of the tape, the first direction being in the direction of the length of the tape the second direction being in the width direction of the tape.

8. A method of formatting an optical medium having a number of adjacent tracks for storing digital optical information extending in a first direction, the tracks separated by a pitch amount in a second direction, the method comprising the steps of:
   a) creating a first tracking mark on a first position of a first track,
   b) creating a second tracking mark on second position of a second track adjacent to the first track,
   c) creating a third tracking mark on a third position of a third track adjacent to the first track, and
   d) configuring the tracking marks to extend in the second direction such that optical reading of the first track will detect cross-talk signals of the second and third tracking marks on the adjacent tracks.

9. A system for adjusting the tracking of a track of an optical recording medium having a tracking mark located at one of at least three positions on the track, a first of two adjacent tracks having a tracking mark at one of the other positions and a second of two adjacent tracks having a tracking mark located at the second of the other positions, the system comprising:
   a) an optical signal processor for generating a signal from the track being read,
   b) a first sampler which stores a sample portion of the signal corresponding to a tracking mark at the first of the three positions,
   c) a second sampler which stores a sample portion of the signal corresponding to a tracking mark at the second of the three positions,
   d) a third sampler which stores a sample portion of the signal corresponding to a tracking mark at the third of the three positions,
   e) a operator which operates on the first, second and third samples to determine the two samples that arise from cross-talk of tracking marks from the adjacent tracks, and
   f) a transferor which transfers a correction signal reflecting the difference in amplitudes of the two samples identified as arising from cross-talk.

10. A system as in claim 9, wherein the operator includes three subtractors for determining the difference between each pair of the three samples, each subtractor having a distinct pair of samples as inputs and an output giving the difference between the samples.

11. A system as in claim 10, wherein the operator further include three comparators each having an input from the output of one of the subtractors, each comparator determining whether the output of the subtractor is positive or negative.

12. A system as in claim 11, wherein the operator further includes a decoder receiving as inputs the output of each comparator, the decoder processing the input to determine which of the three subtractors has as both inputs the two samples that arise from the cross-talk of adjacent tracks.

13. A system as in claim 12, wherein the decoder has three outputs, each output reflecting a pair of samples, the output for a pair being selected when the two samples in that pair arise from the cross-talk of adjacent tracks.

14. A system as in claim 13, wherein the transferor includes three normally opened switches, one side of each switch connected to the output of one of the three subtractors, the other side of each switch connected together, the output of each decoder interfacing with the switch connected to the subtractor having as its output the difference of the pair of samples also reflected by the output of the decoder, the output of the decoder closing the associated switch when the pair of samples is selected by the decoder.

15. A method for adjusting the tracking of an optical recording medium comprising the steps of:
   a) generating a signal by reading a track of an optical recorder,
   b) sampling the signal at at least three positions corresponding to tracking mark positions in a servo field along the track,
   c) identifying one sample corresponding to one of the tracking mark positions as being generated by an on-axis tracking mark and identifying the other two samples corresponding to the other two tracking mark positions as being generated by cross-talk signals of adjacent tracks, and
   d) adjusting the tracking based upon the difference in the samples of the cross-talk signals.

16. A system for adjusting the tracking of an optical recording medium comprising:
   a) means for generating a signal by reading a track of an optical recorder,
   b) means for sampling the signal at at least three positions corresponding to tracking mark positions in a servo field along the track,
   c) means for identifying one sample corresponding to one of the tracking mark positions as being generated by an on-axis tracking mark and identifying the other two samples corresponding to the other two tracking mark positions as being generated by cross-talk signals of adjacent tracks, and d) means for adjusting the tracking based upon the difference in the samples of the cross-talk samples.

* * * * *